(12) United States Patent
Krishnan et al.

(10) Patent No.: US 11,681,969 B2
(45) Date of Patent: Jun. 20, 2023

(54) BENCHMARKING DECISION MAKING UNITS USING DATA ENVELOPMENT ANALYSIS

(71) Applicant: SAP SE, Walldorf (DE)

(72) Inventors: Kavitha Krishnan, Bangalore (IN); Ashok Veilumuthu, Bangalore (IN); Baber Farooq, Clifton Hill (AU)

(73) Assignee: SAP SE, Walldorf (DE)

( * ) Notice: Subject to any disclaimer, the term of this patent is extended or adjusted under 35 U.S.C. 154(b) by 396 days.

(21) Appl. No.: 16/921,449

(22) Filed: Jul. 6, 2020

(65) Prior Publication Data
US 2022/0004917 A1    Jan. 6, 2022

(51) Int. Cl.
| | | |
|---|---|---|
| *G06Q 30/00* | (2023.01) | |
| *G06Q 10/0639* | (2023.01) | |
| *G06N 20/00* | (2019.01) | |
| *G06F 18/214* | (2023.01) | |
| *G06F 18/2413* | (2023.01) | |

(52) U.S. Cl.
CPC ..... *G06Q 10/06393* (2013.01); *G06F 18/214* (2023.01); *G06F 18/24147* (2023.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,988,092 | B1 * | 1/2006 | Tang | G06Q 10/06 707/999.001 |
| 2005/0288980 | A1 * | 12/2005 | Feroz | G06Q 40/00 705/35 |
| 2009/0043637 | A1 * | 2/2009 | Eder | G06N 7/01 705/37 |
| 2010/0332289 | A1 * | 12/2010 | Datta-Read | G06Q 30/02 705/14.46 |
| 2017/0024678 | A1 * | 1/2017 | Sodani | G06Q 10/06398 |
| 2017/0290024 | A1 * | 10/2017 | Ouyang | H04L 41/0896 |
| 2019/0174207 | A1 * | 6/2019 | Celia | H04Q 9/00 |
| 2019/0333078 | A1 * | 10/2019 | Bala | G06Q 30/0201 |
| 2020/0084087 | A1 * | 3/2020 | Sharma | H04W 24/04 |
| 2020/0265119 | A1 * | 8/2020 | Desai | G05B 19/0426 |
| 2020/0334603 | A1 * | 10/2020 | Abdollahnejadbarough | G06F 40/20 |

OTHER PUBLICATIONS

Forrester; Estimating confidence intervals in DEA; Portland Univ; 1917.*
Gilbarg; Warehouse_benchmarking_using_weight_restricted_DEA; Morehouse College; 1917.*

(Continued)

*Primary Examiner* — Radu Andrei
(74) *Attorney, Agent, or Firm* — Schwegman Lundberg & Woessner, P.A.

(57) ABSTRACT

In an example embodiment, a recommendation engine provides recommendations as to how decision-making units (DMUs) can improve efficiency, or savings can utilize machine learning algorithms and data envelopment analysis (DEA). DEA is a linear programming methodology, and is used in the example embodiment to identify one or more key performance indices (KPIs) that are most important to a DMU.

20 Claims, 7 Drawing Sheets

(56) References Cited

OTHER PUBLICATIONS

Qin, Zhiwei, et al., "Joint Variable Selection for Data Envelpment Analysis via Group Sparsity", arXiv:1402.3740v1 [math.OC], (2014), 28 pgs.

Qin, Zhiwei, "Joint Variable Selection for Data Envelpment Analysis via Group Sparsity", arXiv:1402.3740v1 [math.OC], (2014), 28 pgs.

* cited by examiner

SCORECARD

| METRICS | VALUE | TOP 25% | AVERAGE |
|---|---|---|---|
| SOURCING SAVINGS RATE AS % OF SPEND SOURCED – ARIBA | 9.31 | 12.2605 | 8.365596 |
| SOURCING SAVINGS RATE AS % OF SPEND SOURCED FOR RFP – ARIBA | 13.46 | | |
| SOURCING SAVINGS RATE AS % OF SPEND SOURCED FOR AUCTION – ARIBA | 1.97 | | |
| SOURCING SAVINGS RATE FOR AWARDED EVENTS (IN %) – ARIBA | 0 | 12.50036 | 7.975854 |
| SOURCING SAVINGS RATE FROM AWARED RFP EVENT (IN %) – ARIBA | 0 | 11.16186 | 6.89185 |
| SOURCING SAVINGS RATE FROM AWARDED AUCTION EVENT (IN %) – ARIBA | 0 | 14.60417 | 9.995537 |
| ESTIMATED SOURCING SAVINGS RATE (IN %) – ARIBA | 9.31 | 14.215 | 9.515452 |
| ESTIMATED SOURCING SAVINGS RATE FOR RFP (IN %) – ARIBA | 13.46 | 13.9356 | 9.669163 |
| ESTIMATED SOURCING SAVINGS RATE FOR AUCTION (IN %) – ARIBA | 1.97 | 14.215 | 9.415571 |
| SAVINGS PER EVENT – ARIBA | 81324 | 103570.4 | 70792.54 |

RECOMMENDATIONS

SPEND SOURCED IN ARIBA IS $72,134,290; THIS RECORDED SPEND IS COMING FROM 58% OF THE TOTAL EVENTS (RFP AND AUCTIONS: 228) PROCESSED IN ARIBA

2.63% OF EVENTS ARE AWARDED IN ARIBA SOURCING AND CAN BE COMPARITIVELY IMPROVED AGAINST THE BEST IN CLASS BENCHMARK OF 52.22%

THERE IS NO AWARDED SPEND RECORDED IN THE SYSTEM DUE TO WHICH SAVINGS ARE NOT CAPTURED FOR AWARDED EVENTS
AS A BEST PRACTICE IT IS RECOMMNEDED
I. AWARD MORE EVENTS ON E-SOURCING PLATFORM SO THAT THERE IS BETTER VISIBILITY OF THE SOURCING SPEND AND TRACKING OF REALIZED SAVINGS.
II. OR CLOSE OUT THE EVENTS FORMALLY IN THE SYSTEM

THE ORGANIZATION'S ESTIMATED SOURCING SAVINGS COULD BE 9.31%. THIS MAY BE A RESULT OF THE TRANSPARENCY THE SYSTEM PROVIDES TO SUPPLIERS TO ENSURE COMPETITIVENESS, DRIVING UP HIGHER SAVINGS.

BENCHMARKING DECISION MAKING UNITS USING DATA ENVELOPMENT ANALYSIS

TECHNICAL FIELD

This document generally relates to recommendation engines for decision-making units. More specifically, this document relates to benchmarking decision-making units using data envelopment analysis.

BACKGROUND

Business-to-Business (B2B) marketplaces have evolved to now be managed completely online. In such marketplaces, businesses buy from and sell to other businesses. A B2B marketplace often also will provide various analysis tools to businesses to manage their transactions and relationships within the marketplace.

BRIEF DESCRIPTION OF DRAWINGS

The present disclosure is illustrated by way of example and not limitation in the figures of the accompanying drawings, in which like references indicate similar elements.

FIG. 5 is a screen capture illustrating a graphical user interface in accordance with an example embodiment.

DETAILED DESCRIPTION

Figure 1:
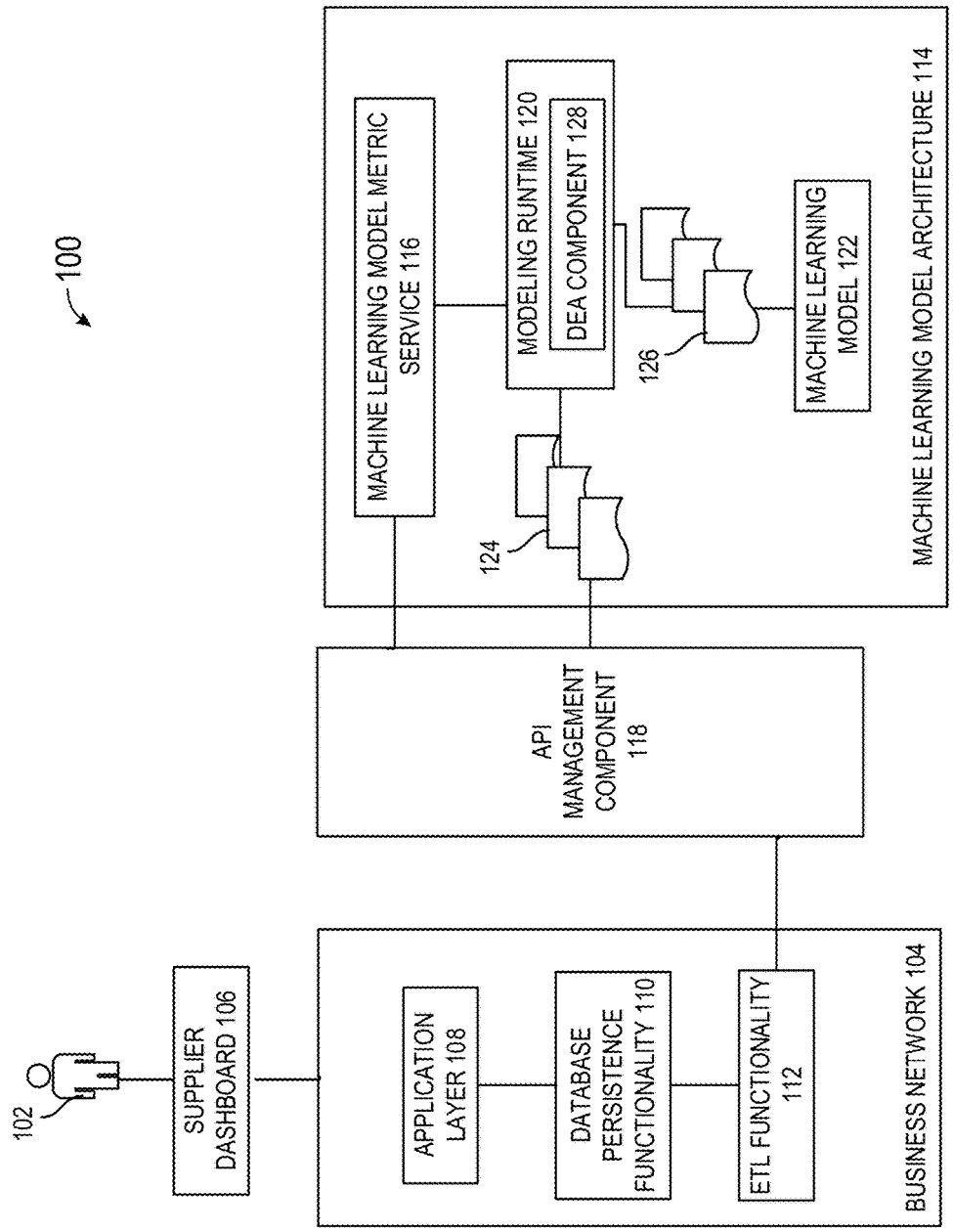
FIG. 1 is a block diagram of a high-volume computer network, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

A decision-making unit (DMU) is a collection or team of individuals within a business that participate in a decision to buy or sell. Such decisions are usually taken collectively. A number of people may be involved in the decision-making process and not everyone will necessarily have the same power. A DMU is typically broken up into five roles: users, influencers, buyers, deciders, and gatekeepers. Users are people in the organization who actually use the products/services. Influencers are the people who can influence the buying decision. Buyers are the people with the formal authority to negotiate with suppliers. Deciders are the people who have the final say in the buying decision. Gatekeepers are the people who control the flow of information to others.

B2B analysis tools typically evaluate DMUs in two general ways. The first is with one or more customer key performance indices (KPIs). These are usually calculated using a series of input parameters and displayed to users in what is called a scorecard. The second way B2B analysis tools typically evaluate DMUs is with benchmarks. Benchmarks measure DMUs against other DMUs. Sometimes a score is provided for the DMU to compare the DMU with others in its industry (called an industry score).

The problem is these different ways of analyzing DMUs are separate and don't really connect to each other in any meaningful way. In an example embodiment, a recommendation engine is provided that takes the KPIs and the benchmarks and provides data driven, prescriptive recommendations as to how each DMU can improve. Furthermore, in an example embodiment, the performance of the metrics is continuously monitored to provide near real-time recommendations.

In an example embodiment, a recommendation engine that provides recommendations as to how Decision Making Units (DMUs) can improve efficiency or savings can utilize machine learning algorithms and data envelopment analysis (DEA). DEA is a linear programming methodology, and is used in the example embodiment to identify one or more key performance indices (KPIs) that are most important to a DMU. DEA is nonparametric and empirically measures productive efficiency of DMUs. Non-parametric approaches have the benefit of not assuming a particular form or shape for the frontier.

The best performing DMUs envelop all other DMUs to form an efficient frontier. Therefore, the underperforming DMUs fall inside the envelop and the very objective of DEA is to determine the effort involved in moving these underperforming DMUs towards their respective achievable position on the frontier inferred from their peers.

Furthermore, in an example embodiment, users can alter the input/output parameters to arrive at a new efficient frontier. This provides flexibility to assess the network based on the various parameters that are important to the organization and allows for customization options.

DEA allows multiple input and multiple outputs to arrive at an efficiency score for the DMU. The DMU may be calculated as a ratio of weighted average of all outputs to weighted inputs. The inputs and the outputs can have different units. DEA allows the system to determine how well the DMU is performing with respect to its peers, but not compared to a theoretical maximum. As such, the recommendation(s) coming out of the system are pragmatic and set realistic goals to achieve, with a given set of inputs, how to produce better output. DEA also provides a "knob' to tune the input and output parameters. One can add or remove inputs and outputs from the model and easily rerun the DEA model to provide pragmatic recommendations.

FIG. 1 is a block diagram of a high-volume computer network 100, in accordance with an example embodiment. The high-volume computer network 100 comprises different heterogeneous software and/or hardware components. Specifically, a supplier user 102 may access functionality within business network 104 via a supplier dashboard 106. Business network 104 may include an application layer 108, a database persistence functionality 110, and an extract, transform, and load (ETL) functionality 112. The application layer 108 provides business network functionality to the supplier user 102 via the supplier dashboard 106. The application layer 108 may also provide business network functionality to other users via other dashboards not pictured here, such as to buyer users and third-party users. This business network functionality may include, for example, functionality related to the procurement of goods and/or services from one business entity (supplier) to another business entity (buyer). DMU information, such as various KPIs for each DMU, may be stored by the database persistence functionality 110 and can be retrieved using the ETL functionality 112.

Separately, a machine learning model architecture 114 may include a machine learning model metric service 116 that maintains several application program interfaces (APIs) to provide recommendations for DMUs to improve efficiency and other related information. These APIs may be maintained by an API management component 118. The machine learning model metric service 116 can be invoked from the application layer 108 of the business network 104 using, for example, the Hyper Text Transport Protocol Secure (HTTPS).

In some example embodiments, the machine learning model metric service 116 may provide a stateless connection mechanism in accordance with the Representational State Transfer (REST) architecture paradigm. Data from business network 104 is transferred to the machine learning model architecture 114 by the ETL functionality 112 periodically (e.g., monthly, quarterly) for training. The outcome of this training is a machine learning model 122, which is trained using a training dataset 124 extracted from the database persistence functionality 110 (via, for example, the ETL functionality 112).

Specifically, the modeling runtime 120 may act to generate one or more features 126, including some but not necessarily all of the KPIs, from the DMU information. In an example embodiment, the modeling runtime 120 contains a DEA component 128 that performs DEA on the KPIs from the database persistence functionality 110. The DEA process figures out which of these KPIs are considered important; thus the DEA component 128 may provide a subset of the KPIs to be used for training the machine learning model 122. The one or more features 126 may then be used to train the machine learning model 122 in a process that will be described in more detail later.

When the application layer 108 invokes an API call through API management component 118 to machine learning model metric service 116 to obtain one or more recommendations for a DMU, non-training DMU information is fed to the machine learning model 122 to obtain these recommendations. This process may occur in real-time or near-real-time, and may be called inference or prediction.

As an example, assume that there are hundreds of potential KPIs for each DMU. The DEA component 128 may perform DEA in order to determine that, for example, the most important KPIs are the number of employees in a sourcing department, number of reverse auctions conducted, number of purchase orders, number of invoices, purchase order spend, and invoice spend. While there could be many different outputs, for simplicity here a single output is used: savings percentage. Table 1 below is an example table that can represent these inputs and outputs for different customers, as a result of the DEA.

TABLE 1

| DMUs | Input 1: # of Employees in Sourcing Department | Input 2: # of Reverse Auctions Conducted | Input 3: # of POs | Input 4: # of Invoices | Input 5: PO Spend | Input 6 Invoice Spend | Output 1: Savings percentage |
|---|---|---|---|---|---|---|---|
| Customer 1 | | | | | | | |
| Customer 2 | | | | | | | |
| Customer 3 | | | | | | | |
| ... | | | | | | | |
| Customer n | | | | | | | |

Figure 2:
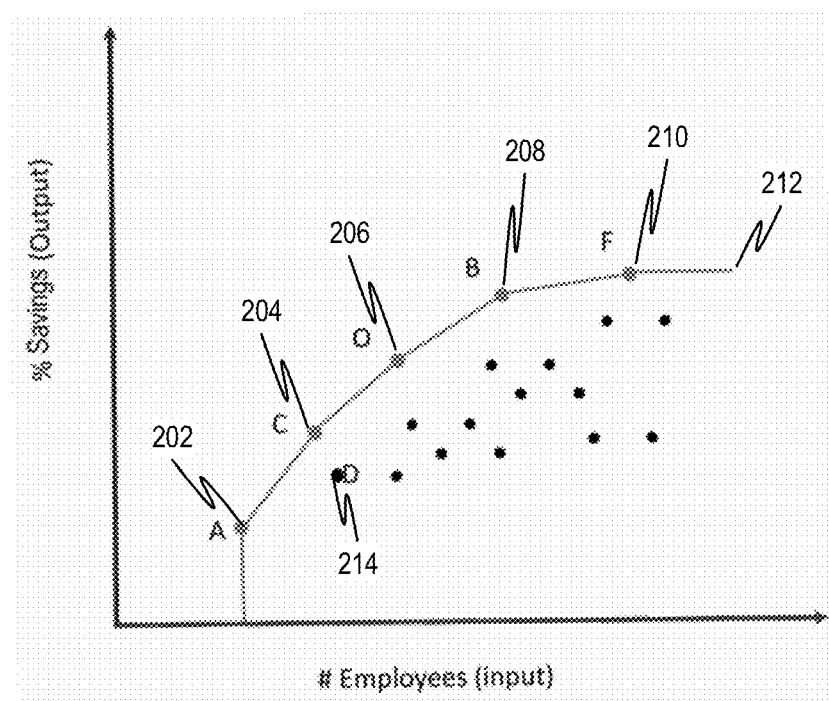
FIG. 2 is a diagram illustrating a graph of customers and an input and output parameter, in accordance with an example embodiment.

For visual representation, each of the customers may be plotted on a graph. FIG. 2 is a diagram illustrating a graph of customers and an input and output parameter, in accordance with an example embodiment. Here, five different high-performing DMUs are identified. These are customers A 202, C 204, O 206, B 208, and F 210. These are the customers who have maximum savings with respect to their number of employees, and thus represent the efficient frontier. A line 212 may be drawn connecting these high-performing DMUs 202, 204, 206, 208, 210, with the line 212 representing the edge of the efficient frontier. There is also one non-performing DMU D 214. As can be seen, D 214 is plotted under the line 212.

Figure 3:
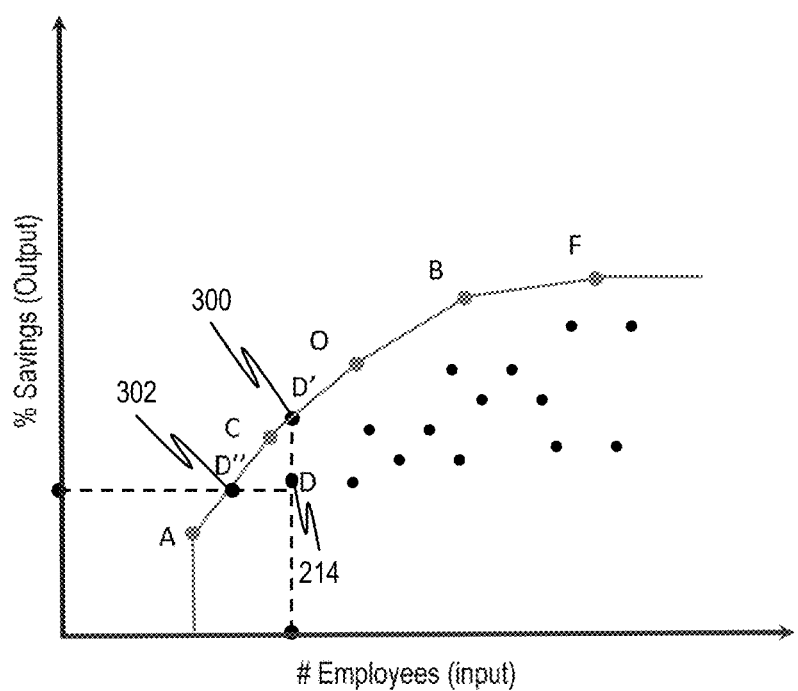
FIG. 3 is a diagram illustrating a graph of customers and an input and output parameter with potential new states for a customer, in accordance with an example embodiment.

The machine learning model 122 may then be used to determine recommendations on how D 214 can achieve potential new states for D 214 that result in D 214 getting into the efficient frontier. FIG. 3 is a diagram illustrating a graph of customers and an input and output parameter with potential new states for a customer, in accordance with an example embodiment. Here, new states D' 300 and D" 302 have been identified. D' 300 informs what is the incremental savings that can be achieved with the same set of employees in order to enter the efficient frontier, while D" 302 informs what is the reduction in the number of employees that is needed to be achieved with the same savings in order to enter the efficient frontier.

The DEA component 128 may implement an additive DEA model using Variable Returns to Scale (VRS).

Consider that there are N DMUs, $\{1, \ldots, N\}$, each one operating on L inputs, $\{x_{1i}, \ldots, x_{Li}\}$, and A outputs, $\{y_{1i}, \ldots, y_{Mi}\}$, the relative efficiencies of individual DMUs can be obtained by solving the following primal formulation of Additive DEA Model for each DMU p:

$$\text{Minimize:} \sum_{l=1}^{L} x_{lp} u_{lp} - \sum_{m=1}^{M} y_{mp} v_{mp} + w_p \quad (1)$$

$$\text{Subject to:} \sum_{l=1}^{L} x_{lp} u_{lp} - \sum_{m=1}^{M} y_{mi} v_{mp} + w_p \geq 0 \ \forall \ i = 1, \ldots, N$$

-continued $$u_{lp} \geq 0 \; \forall \; l = 1, \ldots, L$$

$$v_{mp} \geq 0 \; \forall \; m = 1, \ldots, M$$

Too many input and output candidates makes variable selection all the more critical in identifying meaningful relative efficiencies of DMUs. In an example embodiment, Lasso shrinkage is used in Linear Regression to reduce the model by picking only the predictors that carry exclusive information in predicting dependent/response variables. Lasso achieves this by applying L1 regularization to the squared error minimization. The structure of the additive model described above facilitates Lasso regularization to also select the key input and output variables that constitute the relative efficiencies. The additive DEA model with Lasso regularization is as follows:

$$\text{Minimize: } \sum_{l=1}^{L} x_{lp} u_{lp} - \sum_{m=1}^{M} y_{mp} v_{mp} + w_p + \lambda \sum_{l=1}^{L} u_{lp} + \gamma \sum_{m=1}^{M} v_{mp} \quad (2)$$

$$\text{Subject to: } \sum_{l=1}^{L} x_{li} u_{lp} - \sum_{m=1}^{M} y_{mi} v_{mp} + w_p \geq 0 \; \forall \; i = 1, \ldots, N$$

$$u_{lp} \geq 0 \; \forall \; l = 1, \ldots, L$$

$$v_{mp} \geq 0 \; \forall \; m = 1, \ldots, M$$

As this formulation is run once for each DMU, the chosen input and output variables need not be consistent across DMUs. In an example embodiment, however, it is beneficial to determine key input and output variables that are consistent across all the DMUs. Joint variable selection, which can be used as an extension to the additive DEA model, can be used to accomplish this. It utilizes group Lasso to select a fewer number of groups of correlated variables (both inputs and outputs) that are consistent across DMus. The mathematical formulation of a joint model for variable selection is as follows:

$$\text{Minimize: } \sum_{p=1}^{N} \left( \sum_{l=1}^{L} x_{lp} u_{lp} - \sum_{m=1}^{M} y_{mp} v_{mp} + w_p \right) + \lambda \sum_{l=1}^{L} \|u_{1.}\|_2 + \gamma \sum_{m=1}^{M} \|v_{m.}\|_2 \quad (3)$$

$$\text{Subject to: } \sum_{l=1}^{L} x_{li} u_{lp} - \sum_{m=1}^{M} y_{mi} v_{mp} + w_p \geq 0$$

$$\forall \; p = 1, \ldots, N, i = 1, \ldots, N$$

$$u_{lp} \geq 0 \; \forall \; p = 1, \ldots, N, l = 1, \ldots, L$$

$$v_{mp} \geq 0 \; \forall \; p = 1, \ldots, N, m = 1, \ldots, M$$

In an example embodiment, the potential output variables are limited to those involving savings and process efficiency. Examples include savings due to price reductions, savings due to operational efficiency, reduction in days payable outstanding, and reduction in number of full-time employees in the procurement department. In a further example embodiment, the DMUs themselves or other users can choose the output variable they would like to focus on, and the input parameters are dynamically updated in light of this selection, allowing the input parameters to be used as levers to tune the output.

No matter the output(s) chosen, a measure of efficiency may be computed as follows $$\text{Efficiency} = \frac{\text{weighted sum of outputs}}{\text{weighted sum of inputs}}$$

Which may be written as $$\text{Efficiency of unit } j = \frac{u_1 y_{1j} + u_2 y_{2j} + \ldots}{v_1 x_{1j} + v_2 x_{2j} + \ldots}$$

where $u_1$=the weight given to output 1
  $y_{1j}$=amount of output 1 from unit j
  $v_1$=weight given to input 1
  $x_{1j}$=amount of input 1 to unit j.

It should be noted that FIGS. 2 and 3 depict the DEA process using two dimensions, but in many embodiments the DEA process will actually be considering multiple input(s) and potentially multiple output(s) as well, and as such representations that occur in three or more dimensions may be more commonplace in example embodiments than the two-dimensional representations depicted here.

Figure 4:
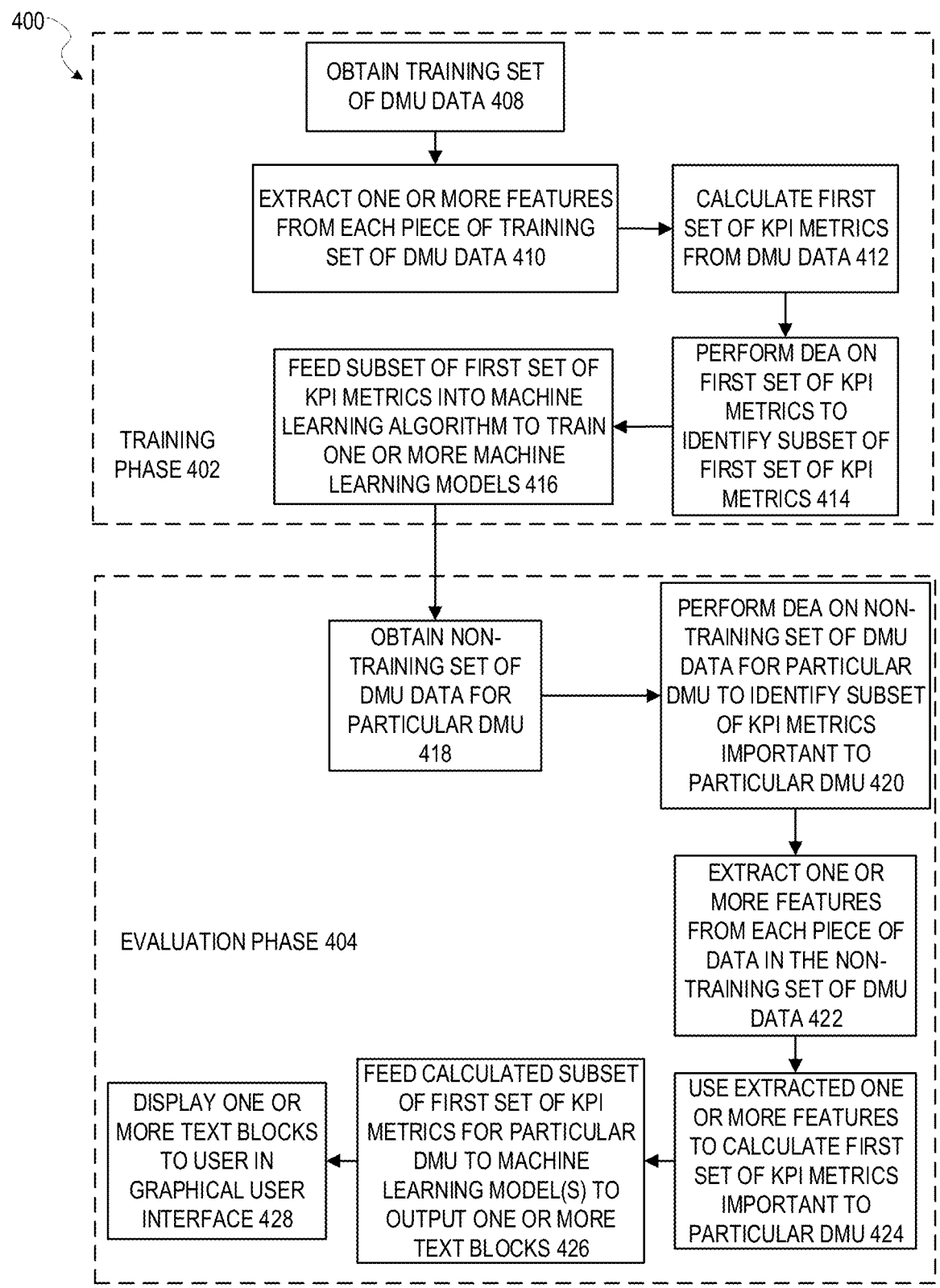
FIG. 4 is a flow diagram illustrating a method of utilizing one or more machine learning models to recommend solutions for improving efficiency of DMUs in a computer network, in accordance with an example embodiment.

FIG. 4 is a flow diagram illustrating a method 400 of utilizing one or more machine learning models to recommend solutions for improving efficiency of DMUs in a computer network, in accordance with an example embodiment. The method 400 may be broken up into two phases: a training phase 402 and an evaluation phase 404. Generally, the training phase 402 involves training one or more machine learning models to generate recommendations for improving efficiency. Once the training phase 402 is complete, the method 400 may progress to an evaluation phase 404 where non-training DMU data is fed to the trained machine learning model(s) to generate recommendations for DMUs identified in the non-training transaction data.

Beginning with the training phase 402, at operation 408 a training set of DMU data is obtained from a database. The training set of DMU data may be, for example, various measurements of the DMU (such as size of procurement department) and transactions engaged in by the DMU (such as total spend). At operation 410, one or more features may be extracted from each piece of the training set of DMU data. The mechanism involved in the feature extraction may depend on the underlying feature. As will be seen, these features may be used as a basis for one or more KPI calculations, and thus the features chosen to be extracted will be those that pertain to the one or more KPI calculations.

At operation 412, a first set of KPI metrics are calculated from the DMU data. It should be noted that some of the KPI metrics may be simply the pieces of DMU data itself (and specifically from the extracted features), while others involve various calculations or functions performed on the DMU data. This depends on the nature of how the DMU data is stored in the database. For example, with respect to total number of employees in a procurement department, the DMU may store this value as its own data entry in the database, and thus calculating a KPI metric for the total number of employees in the procurement department may simply involve taking the value from the database. In other implementations, the DMU may not store a value for total number of employees in the procurement department but rather the database may store individual employee records, which each potentially indicating that the corresponding employee works in the procurement department. In this implementation, calculating a KPI metric for the total number of employees in the procurement department involves counting up the number of employee records that indicate that the corresponding employee works in the procurement department.

At operation 414, DEA is performed on the first set of KPI metrics to identify a subset of the first set of KPI metrics that is considered to be important with respect to improving efficiency. In some example embodiments, this subset will contain fewer KPI metrics than the first set. It should be noted that the precise subset chosen can vary depending on the DMU. For example, DMU A may have a different subset of KPIs than DMU B at the conclusion of operation 414.

At operation 416, the subset of the first set of KPI metrics is fed to a machine learning algorithm to train one or more machine learning models to output recommendations as to how to improve efficiency for a DMU. Specifically, the training involves assigning one or more predefined recommendation text blocks as labels for DMU data in the training set that correspond to each DMU. Thus, for example, DMU A may be labeled with one or more predefined recommendation text blocks that correspond to recommendations to improve the efficiency of DMU A based on the subset of KPI metrics considered important for DMU A. DMU B may be labeled with the same or different one or more predefined recommendation text blocks that correspond to recommendations to improve the efficiency of DMU B based on the subset of KPI metrics considered important for DMU B.

More particularly, the labeled recommendations may be tied to the DEA analysis performed earlier and an analysis of different paths to bring a DMU with particular KPI values into the efficient frontier. For example, in the example of FIG. 3, bringing DMU D 214 to D' 300 may be labeled with one particular text block corresponding to increasing savings using the same number of employees, while bringing DMU D 214 to D" 302 may be labeled with a different text block corresponding to reducing the number of employees without affecting savings.

The machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

It should be noted that while this operation says "a machine learning algorithm," in some embodiments this operation may actually involve using multiple machine learning algorithms to train multiple models whose scores can then be combined. The combination of the models may be considered a single machine learning model.

It should also be noted that the training process involves the machine learning algorithm learning values for weights assigned to each input feature of the machine learning model, here with the input features being the subset of KPIs. As such, each KPI is assigned a different weight and the training process involves incrementally and repeatedly adjusting these weights until an objective function is satisfied, using the training data.

In one embodiment, the machine learning algorithm is a k-nearest neighbor (KNN) classifier. In KNN classification, the output is a class membership. An object is classified by a plurality vote of its neighbors, with the object being assigned to the class most common among its k nearest neighbors, with k being a positive integer. KNN classifiers are trained using vectors in a multidimensional feature space, each with a class label. During training, the feature vectors are stored with class labels. In a classification phase, k is a user-defined constant, and an labeled vector is classified by assigning the label that is most frequent among the k training samples nearest to that query point. Different distance metrics maybe used, such as Euclidean distance or Hamming distance.

FIG. 5 is a screen capture illustrating a graphical user interface in accordance with an example embodiment. Here, one or more calculated KPIs 500 for a particular DMU may be displayed, along with one or more text blocks 502, 504 reflecting recommendations output by the machine learning model(s), as described above.

EXAMPLES

Example 1. A system comprising:
  at least one hardware processor; and
  a non-transitory computer-readable medium storing instructions that, when executed by the at least one hardware processor, cause the at least one hardware processor to perform operations comprising:
    obtaining a training set of decision making unit (DMU) data;
    calculating a first set of key performance indices (KPI) metrics from the training set of DMU data;
    performing data envelopment analysis (DEA) on the first set of KPI metrics to identify a subset of the first set of KPI metrics;
    feeding the subset of the first set of KPI metrics into a machine learning algorithm to train a machine learning model;
    obtaining a non-training set of DMU data for a particular DMU;
    calculating a subset of the first set of KPI metrics for the particular DMU from the non-training set of DMU data;
    feeding the calculated subset of the first set of KPI metrics for the particular DMU into the machine learned model, outputting one or more text blocks; and
    displaying the one or more text blocks in a graphical user interface.

Example 2. The system of Example 1, wherein the DMU data in the training set is grouped by DMU, and wherein the training the machine learning model includes labelling each DMU data for each DMU group with one or more text blocks corresponding to one or more recommendations as to how to improve efficiency.

Example 3. The system of Example 2, wherein the performing DEA on the first set of KPI metrics includes, for each DMU group in the training set, identifying one or more KPI metrics that reflect important inputs and one or more KPI metrics that reflect important outputs.

Example 4. The system of Example 3, wherein the one or more KPI metrics that reflect important inputs are KPI metrics that impact the one or more KPI metrics that reflect important outputs the most of the one or more KPI metrics.

Example 5. The system of Example 3, wherein the one or more KPI metrics that reflect important outputs include one or more of the following: savings due to price reductions, savings due to operational efficiency, reduction in days payable outstanding, and reduction in number of full-time employees in the procurement department.

Example 6. The system of any of Examples 1-5, wherein the training includes automatically learning a weight assigned to each KPI metric in the subset of the first set of KPI metrics.

Example 7. The system of any of Examples 1-6, wherein the machine learning algorithm is a k-nearest neighbor (KNN) classifier.

Example 8. A method comprising:
calculating a first set of key performance indices (KPI) metrics from a training set of decision making unit (DMU) data;
performing data envelopment analysis (DEA) on the first set of KPI metrics to identify a subset of the first set of KPI metrics;
feeding the subset of the first set of KPI metrics into a machine learning algorithm to train a machine learning model;
obtaining a non-training set of DMU data for a particular DMU;
calculating a subset of the first set of KPI metrics for the particular DMU from the non-training set of DMU data;
feeding the calculated subset of the first set of KPI metrics for the particular DMU into the machine learned model, outputting one or more text blocks; and
displaying the one or more text blocks in a graphical user interface.

Example 9. The method of Example 8, wherein the DMU data in the training set is grouped by DMU, and wherein the training the machine learning model includes labelling each DMU data for each DMU group with one or more text blocks corresponding to one or more recommendations as to how to improve efficiency.

Example 10. The method of Example 9, wherein the performing DEA on the first set of KPI metrics includes, for each DMU group in the training set, identifying one or more KPI metrics that reflect important inputs and one or more KPI metrics that reflect important outputs.

Example 11. The method of Example 10, wherein the one or more KPI metrics that reflect important inputs are KPI metrics that impact the one or more KPI metrics that reflect important outputs the most of the one or more KPI metrics.

Example 12. The method of Example 10, wherein the one or more KPI metrics that reflect important outputs include one or more of the following: savings due to price reductions, savings due to operational efficiency, reduction in says payable outstanding, and reduction in number of full time employees in the procurement department.

Example 13. The method of any of Examples 8-12, wherein the training includes automatically learning a weight assigned to each KPI metric in the subset of the first set of KPI metrics.

Example 14. The method of any of Examples 8-13, wherein the machine learning algorithm is a KNN classifier.

Example 15. A non-transitory machine-readable medium storing instructions which, when executed by one or more processors, cause the one or more processors to perform operations comprising:
calculating a first set of key performance indices (KPI) metrics from a training set of decision making unit (DMU) data;
performing data envelopment analysis (DEA) on the first set of KPI metrics to identify a subset of the first set of KPI metrics;
feeding the subset of the first set of KPI metrics into a machine learning algorithm to train a machine learning model;
obtaining a non-training set of DMU data for a particular DMU;
calculating subset of the first set of KPI metrics for the particular DMU from the non-training set of DMU data;
feeding the calculated subset of the first set of KPI metrics for the particular DMU into the machine learned model, outputting one or more text blocks; and
displaying the one or more text blocks in a graphical user interface.

Example 16. The non-transitory machine-readable medium of Example 15, wherein the DMU data in the training set is grouped by DMU, and wherein the training the machine learning model includes labelling each DMU data for each DMU group with one or more text blocks corresponding to one or more recommendations as to how to improve efficiency.

Example 17. The non-transitory machine-readable medium of Example 16, wherein the performing DEA on the first set of KPI metrics includes, for each DMU group in the training set, identifying one or more KPI metrics that reflect important inputs and one or more KPI metrics that reflect important outputs.

Example 18. The non-transitory machine-readable medium of Example 17, wherein the one or more KPI metrics that reflect important inputs are KPI metrics that impact the one or more KPI metrics that reflect important outputs the most of the one or more KPI metrics.

Example 19. The non-transitory machine-readable medium of Example 17, wherein the one or more KPI metrics that reflect important outputs include one or more of the following: savings due to price reductions, savings due to operational efficiency, reduction in says payable outstanding, and reduction in number of full time employees in the procurement department.

Example 20. The non-transitory machine-readable medium of any of Examples 15-29, wherein the training includes automatically learning a weight assigned to each KPI metric in the subset of the first set of KPI metrics.

Figure 6:
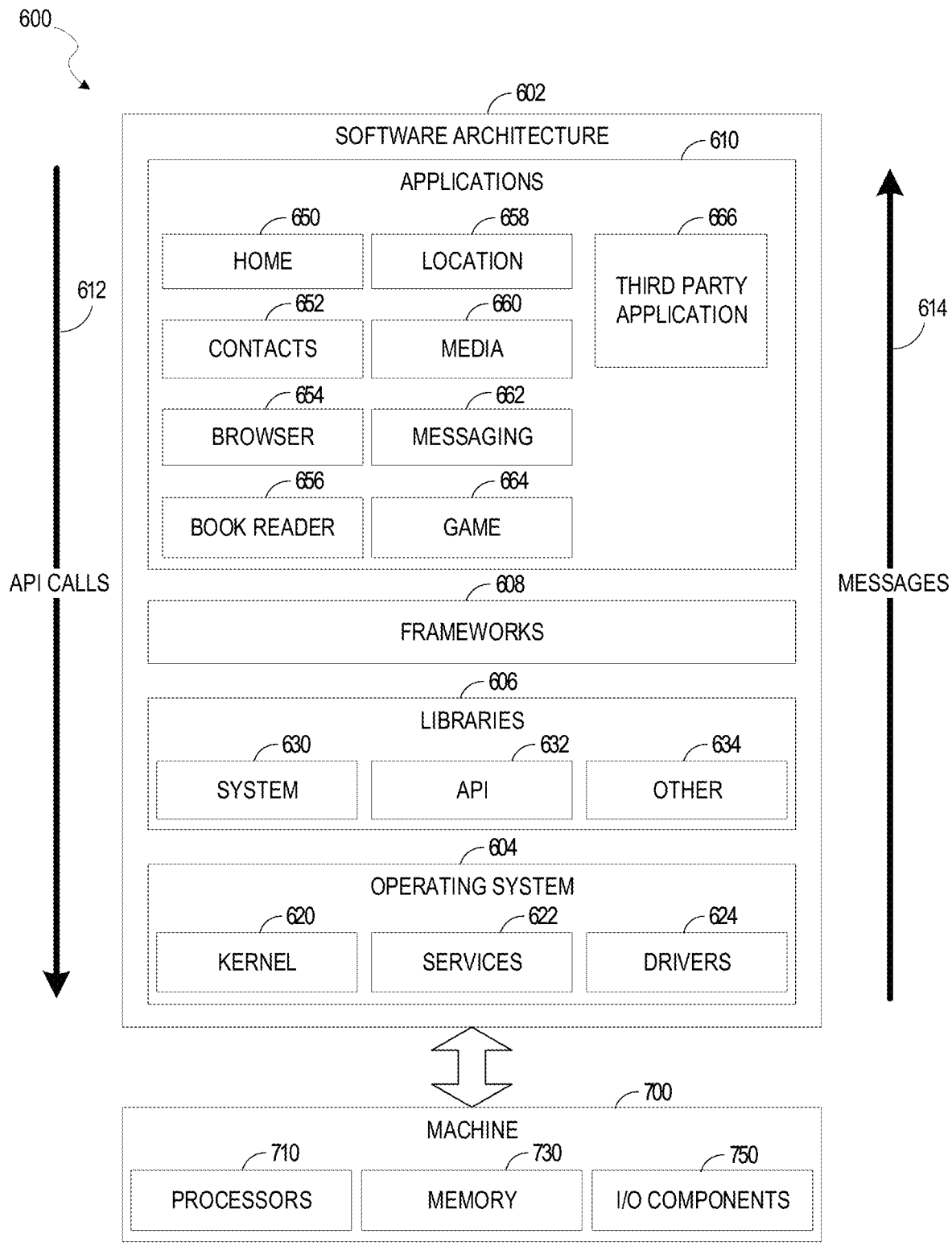
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
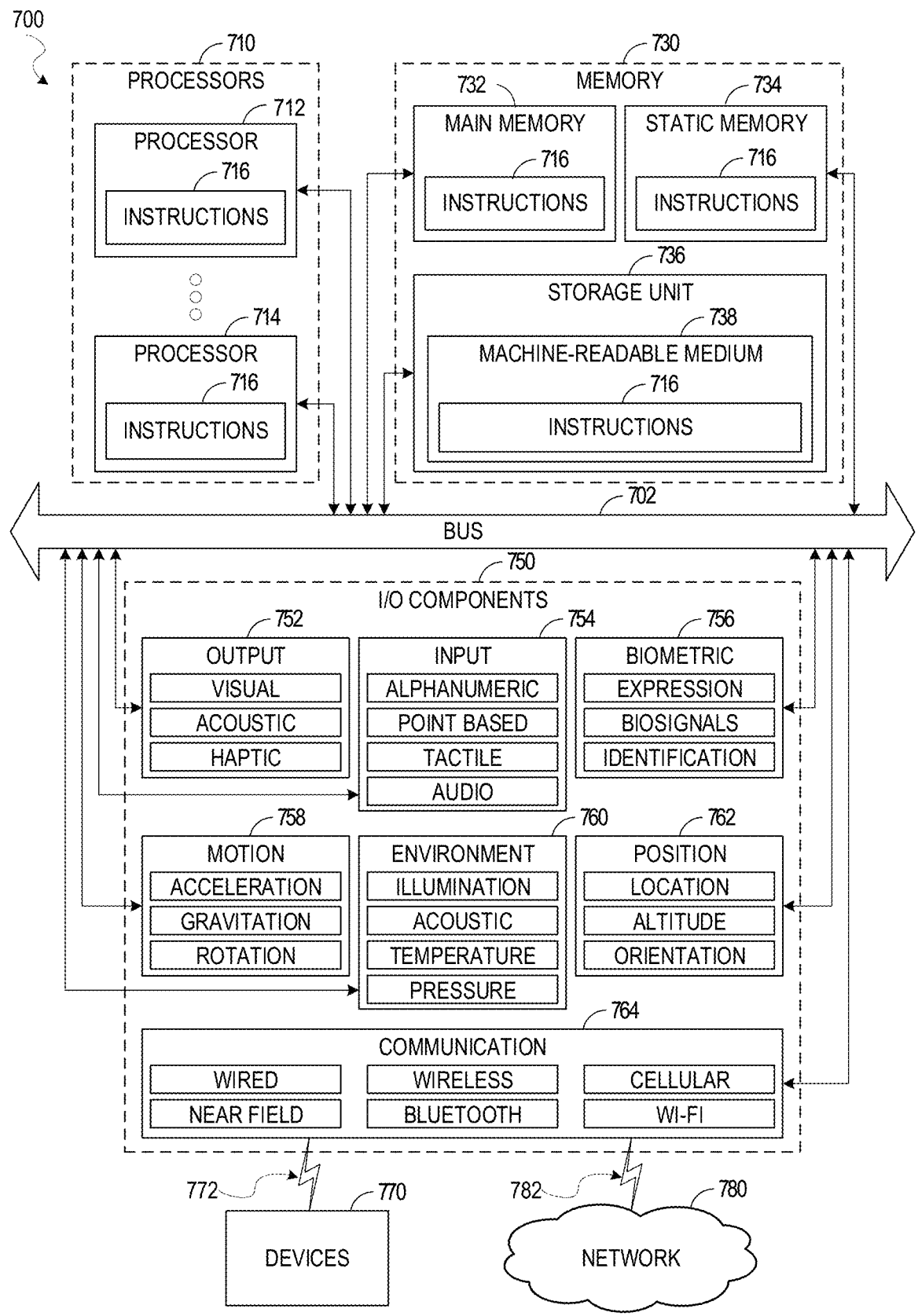
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the methods of FIG. 4 Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   obtaining a training set of decision making unit (DMU) data;
   calculating a first set of key performance indices (KPI) metrics from the training set of DMU data by performing at least one function on the DMU data in the training set;
   performing data envelopment analysis (DEA) on the first set of KPI metrics to identify a subset of the first set of KPI metrics;
   feeding the subset of the first set of KPI metrics into a machine learning algorithm to train a machine learning model;
   obtaining a non-training set of DMU data for a particular DMU;
   calculating a subset of the KPI metrics for the particular DMU from the non-training set of DMU data by performing at least one function on the DMU data for the particular DMU;
   feeding the calculated subset of the KPI metrics for the particular DMU into the machine learned model, outputting one or more text blocks; and
   displaying the one or more text blocks in a graphical user interface.

2. The system of claim 1, wherein the DMU data in the training set is grouped by DMU, and wherein the training the machine learning model includes labelling each DMU data for each DMU group with one or more text blocks corresponding to one or more recommendations as to how to improve efficiency.

3. The system of claim 2, wherein the performing DEA on the first set of KPI metrics includes, for each DMU group in the training set, identifying one or more KPI metrics that reflect important inputs and one or more KPI metrics that reflect important outputs.

4. The system of claim 3, wherein the one or more KPI metrics that reflect important inputs are KPI metrics that impact the one or more KPI metrics that reflect important outputs the most of the one or more KPI metrics.

5. The system of claim 3, wherein the one or more KPI metrics that reflect important outputs include one or more of the following: savings due to price reductions, savings due to operational efficiency, reduction in days payable outstanding, and reduction in number of full-time employees in a procurement department.

6. The system of claim 1, wherein the training includes automatically learning a weight assigned to each KPI metric in the subset of the first set of KPI metrics.

7. The system of claim 1, wherein the machine learning algorithm is a k-nearest neighbor (KNN) classifier.

8. A method, performed by a computer having at least one hardware processor and a memory comprising:
   obtaining a training set of decision making unit (DMU) data;
   calculating a first set of key performance indices (KPI) metrics from the training set of DMU data by performing at least one function on the DMU data in the training set;
   performing data envelopment analysis (DEA) on the first set of KPI metrics to identify a subset of the first set of KPI metrics;
   feeding the subset of the first set of KPI metrics into a machine learning algorithm to train a machine learning model;
   obtaining a non-training set of DMU data for a particular DMU;
   calculating a subset of the KPI metrics for the particular DMU from the non-training set of DMU data by performing at least one function on the DMU data for the particular DMU;
   feeding the calculated subset of the KPI metrics for the particular DMU into the machine learned model, outputting one or more text blocks; and
   displaying the one or more text blocks in a graphical user interface.

9. The method of claim 8, wherein the DMU data in the training set is grouped by DMU, and wherein the training the machine learning model includes labelling each DMU data for each DMU group with one or more text blocks corresponding to one or more recommendations as to how to improve efficiency.

10. The method of claim 9, wherein the performing DEA on the first set of KPI metrics includes, for each DMU group in the training set, identifying one or more KPI metrics that reflect important inputs and one or more KPI metrics that reflect important outputs.

11. The method of claim 10, wherein the one or more KPI metrics that reflect important inputs are KPI metrics that impact the one or more KPI metrics that reflect important outputs the most of the one or more KPI metrics.

12. The method of claim 10, wherein the one or more KPI metrics that reflect important outputs include one or more of the following: savings due to price reductions, savings due to operational efficiency, reduction in days payable outstanding, and reduction in number of full-time employees in the procurement department.

13. The method of claim 8, wherein the training includes automatically learning a weight assigned to each KPI metric in the subset of first set of KPI metrics.

14. The method of claim 8, wherein the machine learning algorithm is a k-nearest neighbor (KNN) classifier.

15. A non-transitory machine-readable medium storing instructions which, when executed by one or more processors, cause the one or more processors to perform operations comprising:

obtaining a training set of decision making unit (DMU) data;

calculating a first set of key performance indices (KPI) metrics from the training set of DMU data by performing at least one function on the DMU data in the training set;

performing data envelopment analysis (DEA) on the first set of KPI metrics to identify a subset of the first set of KPI metrics;

feeding the subset of the first set of KPI metrics into a machine learning algorithm to train a machine learning model;

obtaining a non-training set of DMU data for a particular DMU;

calculating a subset of the KPI metrics for the particular DMU from the non-training set of DMU data by performing at least one function on the DMU data for the particular DMU;

feeding the calculated subset of the KPI metrics for the particular DMU into the machine learned model, outputting one or more text blocks; and displaying the one or more text blocks in a graphical user interface.

16. The non-transitory machine-readable medium of claim 15, wherein the DMU data in the training set is grouped by DMU, and wherein the training the machine learning model includes labelling each DMU data for each DMU group with one or more text blocks corresponding to one or more recommendations as to how to improve efficiency.

17. The non-transitory machine-readable medium of claim 16, wherein the performing DEA on the first set of KPI metrics includes, for each DMU group in the training set, identifying one or more KPI metrics that reflect important inputs and one or more KPI metrics that reflect important outputs.

18. The non-transitory machine-readable medium of claim 17, wherein the one or more KPI metrics that reflect important inputs are KPI metrics that impact the one or more KPI metrics that reflect important outputs the most of the one or more KPI metrics.

19. The non-transitory machine-readable medium of claim 17, wherein the one or more KPI metrics that reflect important outputs include one or more of the following: savings due to price reductions, savings due to operational efficiency, reduction in says payable outstanding, and reduction in number of full-time employees in a procurement department.

20. The non-transitory machine-readable medium of claim 15, wherein the training includes automatically learning a weight assigned to each KPI metric in the subset of the first set of KPI metrics.

* * * * *